(12) United States Patent
Rhee et al.

(10) Patent No.: US 12,021,803 B2
(45) Date of Patent: Jun. 25, 2024

(54) APPARATUS FOR DISPLAYING UNREAD MESSAGES AND METHOD THEREOF

(71) Applicant: SAMSUNG SDS CO., LTD., Seoul (KR)

(72) Inventors: Hyun Ji Rhee, Seoul (KR); Moon Young Kwon, Seoul (KR); Ji Eun Yoon, Seoul (KR); Sun Hyo Lee, Seoul (KR); Yi Sun Chung, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 17/965,987

(22) Filed: Oct. 14, 2022

(65) Prior Publication Data

US 2023/0132663 A1    May 4, 2023

(30) Foreign Application Priority Data

Oct. 29, 2021    (KR) .......................... 10-2021-0146860

(51) Int. Cl.
*H04L 51/043*    (2022.01)
*G06F 3/0482*    (2013.01)
*G06F 3/0488*    (2022.01)
*G06F 16/35*    (2019.01)
*H04L 51/212*    (2022.01)
*H04L 51/224*    (2022.01)

(52) U.S. Cl.
CPC .......... *H04L 51/043* (2013.01); *G06F 3/0482* (2013.01); *G06F 3/0488* (2013.01); *G06F 16/35* (2019.01); *H04L 51/212* (2022.05); *H04L 51/224* (2022.05)

(58) Field of Classification Search
CPC .... G06F 3/0482; G06F 3/0488; G06F 3/0485; G06F 3/04883; G06F 40/279; G06F 16/35; G06Q 50/10; H04L 51/212; H04L 51/224; H04L 51/04; H04L 51/046; H04L 51/216; H04L 51/42; H04L 51/08; H04L 51/043
See application file for complete search history.

(56) References Cited

U.S. PATENT DOCUMENTS

| 8,255,835 B2 * | 8/2012 | Bocking | ............. G06F 3/04895 |
| | | | 715/752 |
| 10,623,363 B2 | 4/2020 | Kim et al. | |
| 11,281,358 B2 * | 3/2022 | Li | ......................... G06F 3/0482 |

(Continued)

FOREIGN PATENT DOCUMENTS

| KR | 10-1143165 B1 | 5/2012 |
| KR | 10-1166362 B1 | 7/2012 |

(Continued)

*Primary Examiner* — Rachel J Hackenberg
(74) *Attorney, Agent, or Firm* — Sughrue Mion, PLLC

(57) ABSTRACT

A method for displaying an unread message according to some embodiments of the present disclosure includes identifying a first unread message of a first chat room in which a user using the computing device participates, and a second unread message of a second chat room in which the user participates, wherein the first chat room and the second chat room are different, and the first unread message and the second unread message are different and simultaneously displaying the first unread message and the second unread message on one screen in response to the user's selection input to a collect view button.

17 Claims, 17 Drawing Sheets

(56) References Cited

U.S. PATENT DOCUMENTS

| | | | | |
|---|---|---|---|---|
| 2014/0075375 A1* | 3/2014 | Hwang | ................ | G06F 3/0485 |
| | | | | 715/784 |
| 2016/0094509 A1* | 3/2016 | Ye | ........................ | H04L 67/306 |
| | | | | 709/206 |
| 2017/0109011 A1* | 4/2017 | Jiang | ................... | G06F 3/04883 |
| 2017/0346777 A1* | 11/2017 | Kim | ....................... | H04L 51/04 |
| 2020/0177535 A1 | 6/2020 | Kim et al. | | |
| 2022/0200944 A1* | 6/2022 | Kheyfets | ............... | G06F 3/0481 |

FOREIGN PATENT DOCUMENTS

| KR | 10-1662024 B1 | 10/2016 |
|---|---|---|
| KR | 10-1835588 B1 | 3/2018 |
| KR | 10-1844583 B1 | 4/2018 |
| KR | 10-2020-0113750 A | 10/2020 |

\* cited by examiner

APPARATUS FOR DISPLAYING UNREAD MESSAGES AND METHOD THEREOF

This application claims the benefit of Korean Patent Application No. 10-2021-0146860, filed on Oct. 29, 2021, in the Korean Intellectual Property Office, the disclosure of which is incorporated herein by reference in its entirety.

BACKGROUND

1. Field

The present disclosure relates to a method and apparatus for displaying a message not read by a user using a messenger application (hereinafter, unread message) on one screen.

2. Description of the Related Art

Messenger applications are being applied to various work environments. For example, a messenger application is used for communication between members of a company, and in particular, the importance of the messenger application is being emphasized more due to the activation of telecommuting.

In order for a user to view unread messages through a conventional messenger application, the user has no choice but to directly access the chat rooms. For this reason, when returning to work after a long absence, if there are many unread messages, it takes a long time to read them.

Accordingly, there is a need for a technique for a user to easily read an unread message.

SUMMARY

A technical problem to be solved through some embodiments of the present disclosure is to provide an apparatus capable of reading a list of unread messages on one screen and a method performed by the apparatus.

Another technical problem to be solved through some embodiments of the present disclosure is to provide an apparatus capable of reading unread messages classified according to importance on one screen, and a method performed by the apparatus.

Another technical problem to be solved through some embodiments of the present disclosure is to provide a device that can easily read unread messages of several chat rooms to which a user belongs, and a method performed by the device.

The technical problems of the present disclosure are not limited to the technical problems mentioned above, and other technical problems not mentioned will be clearly understood by those skilled in the art from the description below.

According to some embodiments of the present disclosure, there is provided a method performed by a computing device for displaying an unread message. The method comprises identifying a first unread message of a first chat room in which a user using the computing device participates, and a second unread message of a second chat room in which the user participates, wherein the first chat room and the second chat room are different, and the first unread message and the second unread message are different, and simultaneously displaying the first unread message and the second unread message on one screen based on the user's selection input to a collect view button.

According to another embodiments of the present disclosure, there is provided an apparatus for displaying an unread message. The apparatus comprises a processor, a network interface, a memory, and a computer program loaded into the memory and executed by the processor, wherein the computer program includes instructions for performing operations comprising identifying a first unread message of a first chat room in which a user participates, and a second unread message of a second chat room in which the user participates, wherein the first chat room and the second chat room are different, and the first unread message and the second unread message are different, and simultaneously displaying the first unread message and the second unread message on one screen based on the user's selection input to a collect view button.

According to another embodiments of the present disclosure, there is provided a non-transitory computer-readable recording medium comprising instructions executable by a processor of a computing device, wherein the instructions, when executed by the processor of the computing device, cause the computing device to perform operations comprising identifying a first unread message of a first chat room in which a user using the computing device participates, and a second unread message of a second chat room in which the user participates, wherein the first chat room and the second chat room are different, and the first unread message and the second unread message are different, and simultaneously displaying the first unread message and the second unread message on one screen based on the user's selection input to a collect view button.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
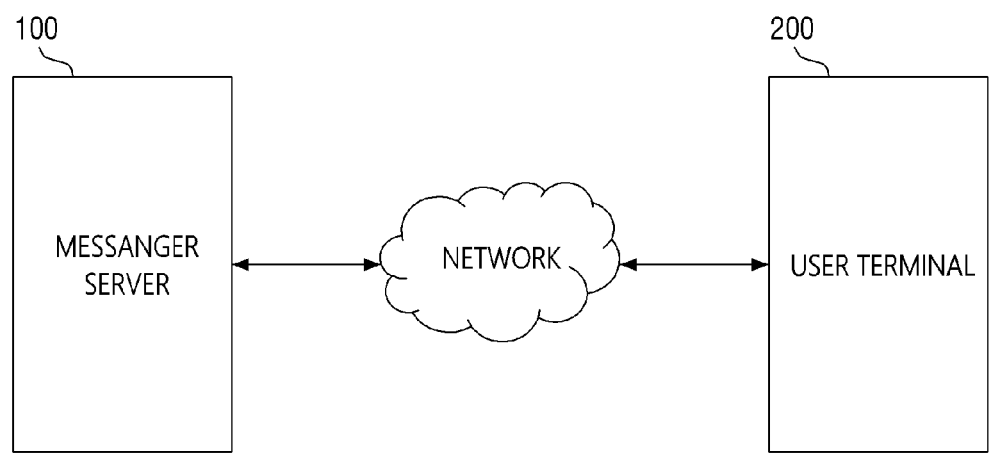
FIG. 1 illustrates an exemplary environment, to which an unread message display device according to some embodiments of the present disclosure can be applied.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, various embodiments of the present disclosure will be described in detail with reference to the accompanying drawings.

FIG. 1 illustrates an exemplary environment, to which an unread message display device according to some embodiments of the present disclosure can be applied. Such an unread message display device may be implemented as the user terminal 200 shown in FIG. 1. In this disclosure, for convenience of understanding, operations performed by the unread message display device will be described later based on the user terminal 200. However, it should be noted that operations of the messenger server 100 supporting operations performed by the user terminal 200 may also be included in the scope of the present disclosure.

Meanwhile, although FIG. 1 shows that one user terminal 200 is applied to the messenger server 100, this is only for convenience of understanding, and the number of user terminals 200 that can be applied to the messenger server 100 can be varied. In addition, FIG. 1 only shows a preferred embodiment for achieving the object of the present disclosure, and some components may be added or deleted as necessary.

Hereinafter, the components shown in FIG. 1 will be described in detail.

First, the messenger server 100 may provide an instant messenger service to the user terminal 200. Here, the instant messenger service may refer to a service, in which users exchange instant messages using a network. It should be noted that all known techniques for providing an instant messenger service to the user terminal 200 may be applied to the messenger server 100. For example, the messenger server 100 may receive an "event" that causes any "reaction or feedback" on the user interface implemented in the user terminal 200 from the user terminal 200. Here, the messenger server 100 may determine a "reaction or feedback" corresponding to the "event" and transmit the response information to the user terminal 200.

As an example of the above-mentioned "event" and "reaction or feedback," in response to the "selection input of the collect view button" transmitted from the user terminal 200, the messenger server may provide the display information to the user terminal 200 so that the "list of unread messages" is displayed. In addition, the messenger server 200 may provide an instant messenger service so that various interactions can occur between the user and the user terminal 200. Examples of such various interactions will be described in detail through the description of the following specification.

The messenger server 100 may be implemented as one or more computing devices. For example, all functions of the messenger server 100 may be implemented in a single computing device. As another example, a first function of the messenger server 100 may be implemented in a first computing device, and a second function may be implemented in a second computing device. Here, the computing device may be a notebook, a desktop, a laptop, etc., but is not limited thereto and may include any type of device having a computing function. However, if the messenger server 100 is an environment, in which the instant messenger service should be provided to the user terminal 200 by interworking with various user terminals 200, it is preferable that the messenger server 100 is implemented as a high-performance server-class computing device. An example of the computing device will be described with reference to FIG. 17 later.

Next, the user terminal 200 may use the instant messenger service provided by the messenger server 100. For example, the user may exchange instant messages with other users by using the user terminal 200. As another example, the user may read a list of unread messages on one screen by using the user terminal 200. Here, the user terminal 200 may have a web browser or a dedicated application installed in order to use the instant messenger service. For example, the user terminal 200 may be any one of a desktop, a workstation, a laptop, a tablet, and a smart phone, but is not limited thereto, and may include any type of device equipped with a computing function. An example of a device equipped with such a computing function will be described later with reference to FIG. 17.

Regarding the environment, to which the unread message display device is applied, in some embodiments, the messenger server 100 and the user terminal 200 may communicate through a network. The network may be implemented as all types of wired/wireless networks such as a local area network (LAN), a wide area network (WAN), a mobile radio communication network, and a Wibro (Wireless Broadband Internet).

So far, an exemplary environment, to which the unread message display device according to some embodiments of the present disclosure can be applied, has been described with reference to FIG. 1. Hereinafter, methods according to various embodiments of the present disclosure will be described in detail.

Each step of the above-described methods may be performed by a computing device. In other words, each step of the methods may be implemented with one or more instructions executed by a processor of a computing device. All steps included in the above methods may be executed by one physical computing device, but the first steps of the method may be performed by a first computing device, and the second steps of the method may be performed by a second computing device. Hereinafter, it is assumed that each step of the methods is performed by the user terminal 200 illustrated in FIG. 1 to continue the description. However, for convenience of description, the description of the operating subject of each step included in the methods may be omitted.

Figure 2:
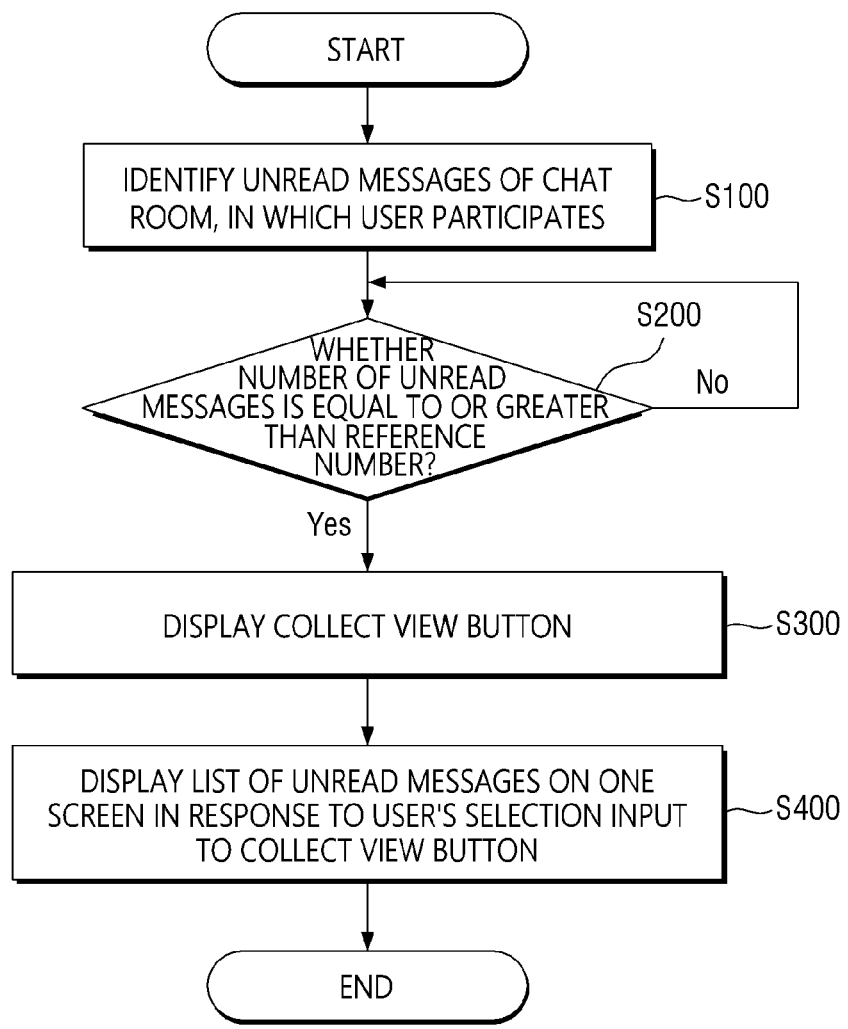
FIGS. 2 to 4 are exemplary flowcharts illustrating a method of displaying an unread message according to some embodiments of the present disclosure.

FIG. 2 is an exemplary flowchart illustrating a method of displaying a list of unread messages.

Referring to FIG. 2, in step S100, an unread message of a chat room, in which the user participates, may be identified. Here, the unread message may mean a message not read by a user using the messenger application. Whether to read the message may be determined based on accessing the chat room corresponding to the unread message in response to the user's selection input. For a more detailed description related thereto, it will be described with reference to FIG. 5.

Figure 5:
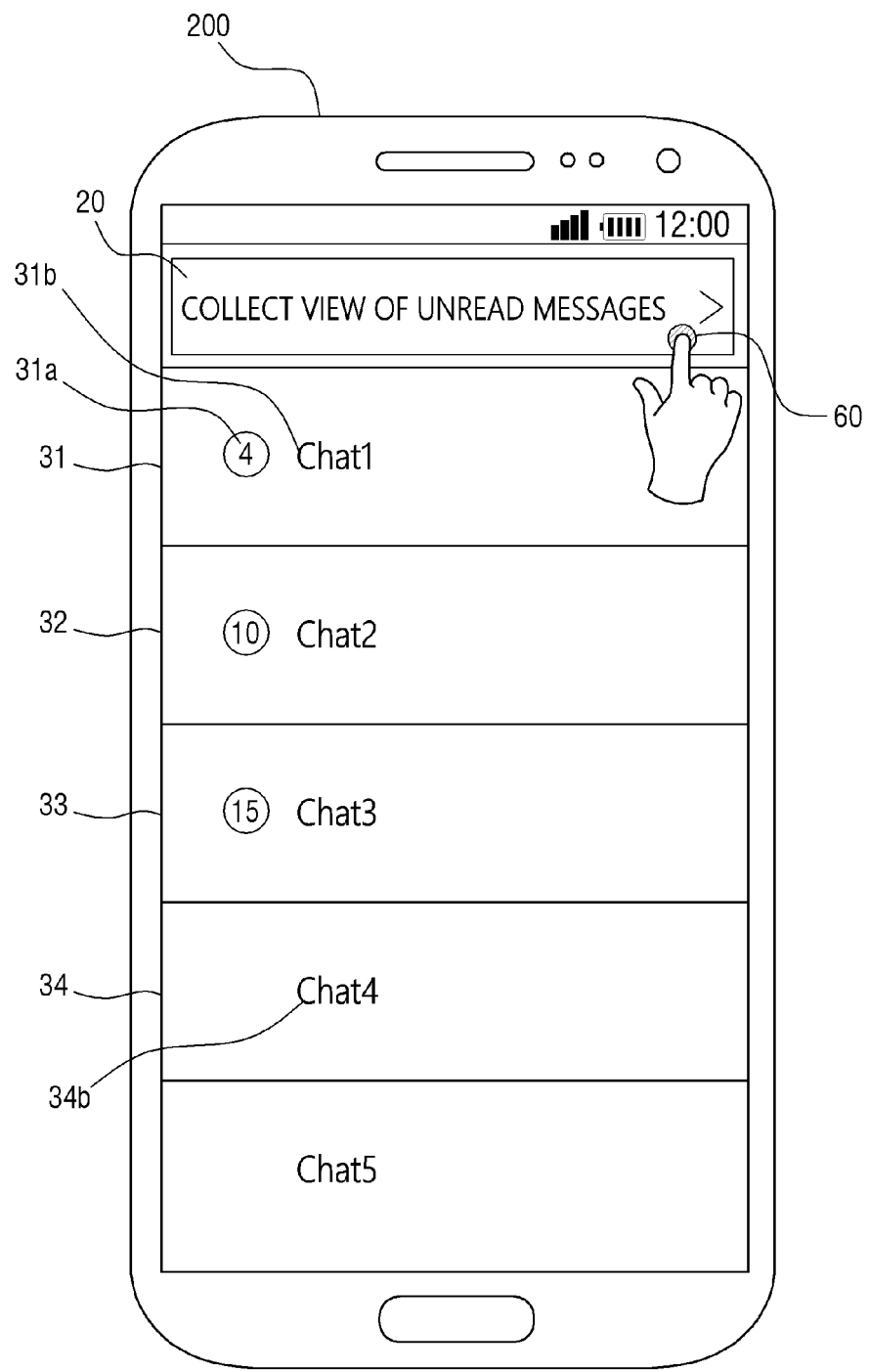
FIG. 5 is an exemplary view for describing a collect view button that may be referred to in some embodiments of the present disclosure.

FIG. 5 illustrates an example of a chat room screen of a messenger application that may be referred to in some embodiments of the present disclosure. As shown in FIG. 5, the messenger application may be executed by the user through the user terminal 200 and may interact with the user through the user interface of the messenger application.

FIG. 5 shows chat rooms 31, 32, 33, and 34, in which the user participates. Here, chat room identifiers 31b and 34b may be displayed in each chat room 31, 32, 33, 34. If unread messages are identified in chat rooms 31, 32, 33, and 34, as shown in FIG. 5, the number identifier 31a of unread messages may be displayed in chat rooms 31, 32, 33, 34.

It will be described again with reference to FIG. 2.

If the number of unread messages is equal to or greater than the reference number (S200), in step S300, a collect view button may be displayed. Here, the collect view button may be a button for moving to a collect view screen, in which a plurality of unread messages of a plurality of chat rooms, in which the user participates, can be collected and viewed.

If the number of unread messages is less than the reference number, the collect view button may not be displayed, but it should be noted that whether the collect view button is displayed or not may vary according to the method of implementing the user interface. For example, the collect view button may always be displayed as a default, and the collect view button may be deactivated.

In addition, the reference number refers to the number of arbitrary unread messages, and may vary according to a method of implementing a user interface.

In step S400, in response to the user's selection input to the collect view button, a list of unread messages may be displayed on one screen. For example, the list of unread message may be displayed simultaneously on one screen. Here, the user's selection input may include various user inputs for selecting a single object including a tap, a double tap, a click, and a double click. Also, the list of unread messages may mean one or more unread messages.

Hereinafter, for a detailed description of the collect view button and the collect view screen, it will be described with reference to FIGS. 5, 6 and 8.

FIG. 5 shows an example of the collect view button 20. The collect view button 20 may be displayed on the chat room screen of the messenger application, as shown in FIG. 5. However, the scope of the present disclosure is not limited to the example illustrated in FIG. 5, and the collect view button 20 may be displayed on any screen provided by the messenger application. Here, in response to the user's selection input 60 to the collect view button 20, the screen of the messenger application may be switched to an example of the collect view screen shown in FIG. 6.

Figure 6:
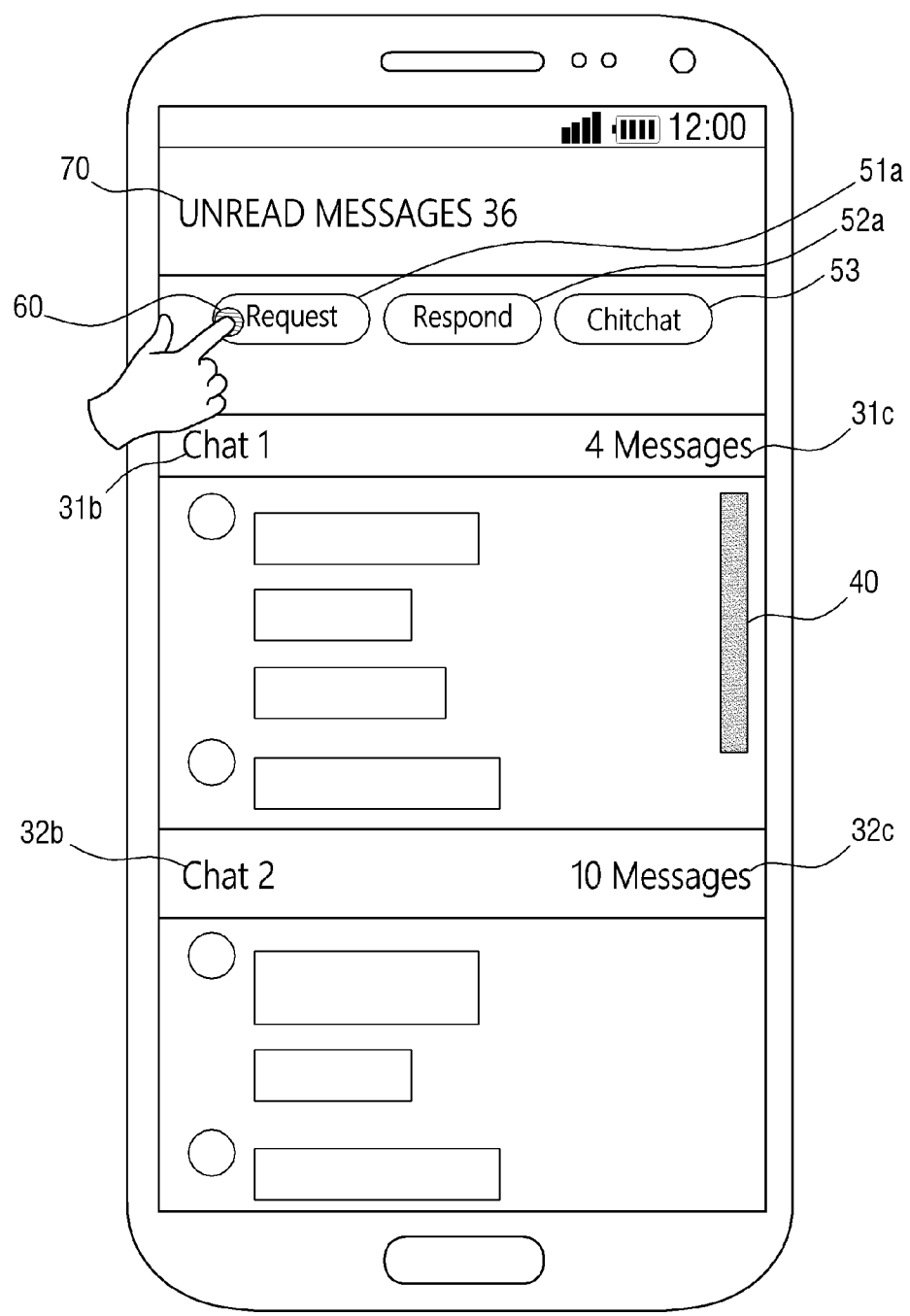
FIG. 6 is an exemplary diagram for describing a collect view screen that may be referred to in some embodiments of the present disclosure.

FIG. 6 shows an example of a collect view screen. A plurality of unread messages of a plurality of chat rooms, in which the user participates, may be displayed (e.g., displayed simultaneously) on the collect view screen shown in FIG. 6. In this case, the displayed plurality of unread messages may be understood as a list of unread messages.

The total number identifier 70 indicating the total number of unread messages may be displayed on the collect view screen shown in FIG. 6. In addition, the chat room identifiers 31b and 32b of the chat room including the unread message among the chat rooms, in which the user participates, may be displayed. In this case, number identifiers 31c and 31c of unread messages in the chat room may be further displayed.

In relation to the collect view screen, in some embodiments, the display order of unread messages included in the list of unread messages is that a set with a greater number of elements in the unread message set corresponding to the chat room may be displayed first. Here, the set of unread messages may mean a set having each unread message as an element. For example, unlike those shown in FIGS. 5 and 6, an unread message set may be displayed on the collect view screen in the order of the third chat room 33 having 15 unread messages, the second chat room 32 having 10 unread messages, and the first chat room 31 having 4 unread messages. In addition, the display order of unread messages may be determined in various ways. For example, the display order of unread messages may be determined irrespective of the order of chat rooms in the time order of unread messages and the reverse time order of unread messages. For example, the display order of the chat room may be determined according to the number of participants in the chat room and the order of importance of the chat room designated in advance, and a set of unread messages corresponding to the chat room may be displayed. According to the present embodiment, the unread message or unread message set expected to be more important to the user may be displayed first than others.

In addition, in the collect view screen illustrated in FIG. 6, a plurality of unread messages included in the list of unread messages may be scrolled in response to movement of the scroll 40. When the scroll 40 shown in FIG. 6 is dragged in the downward direction of the user terminal 200, it may be switched to the collect view screen shown in FIG. 8. For convenience of understanding, the user input related to the movement of the scroll has been described as drag, but any user input other than the drag may be included in the scope of the present disclosure as long as it is an input for moving the scroll 40.

Figure 8:
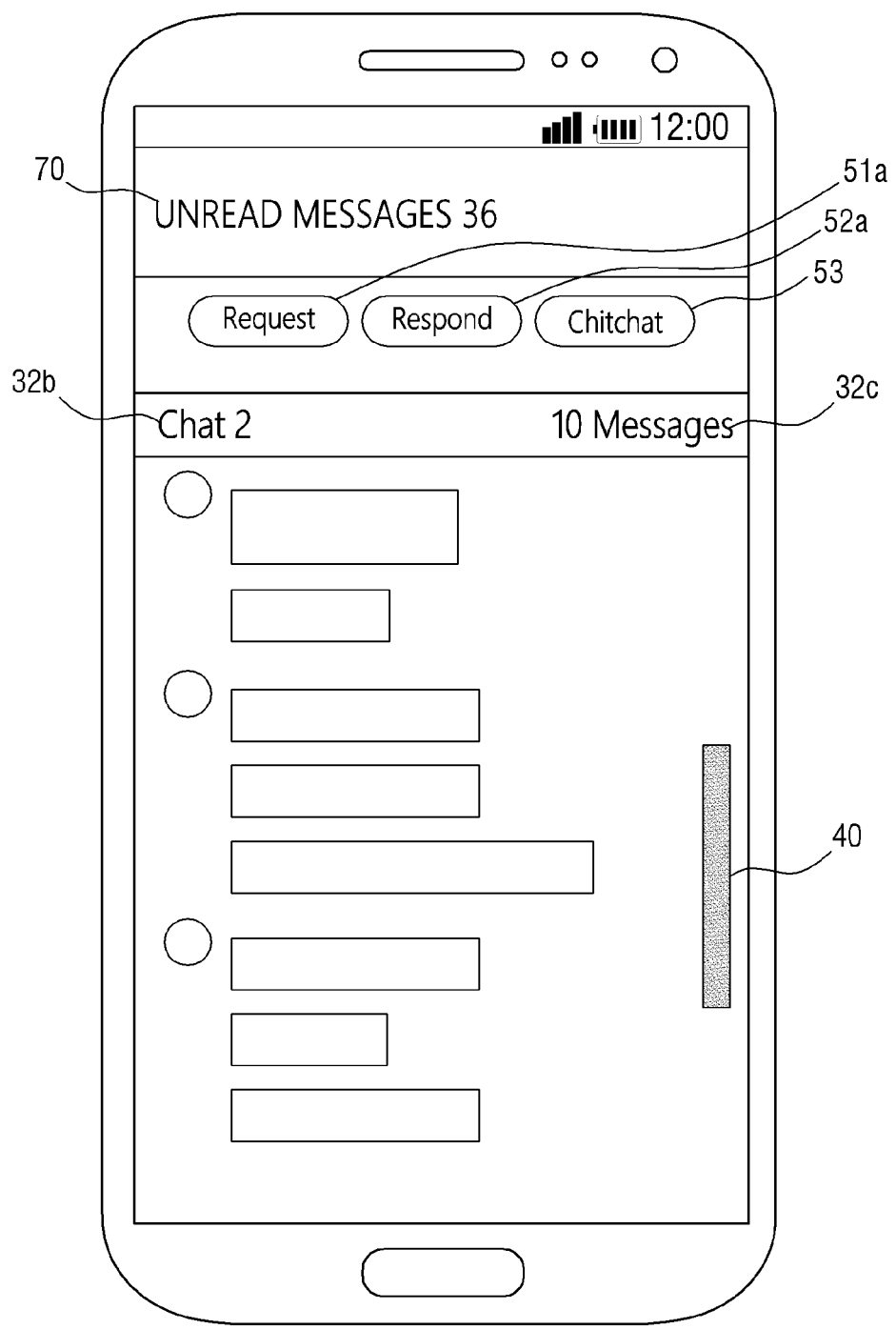
FIGS. 8 to 11 are exemplary views for describing filtering using an indicator that may be referred to in some embodiments of the present disclosure.

Referring to FIG. 8, it can be understood that, as a result of the movement of the above-described scroll 40, the unread message of the second chat room not shown in FIG. 6 may be displayed on the collect view screen. It should be noted that, in addition to screen switching using scroll, all user interfaces for providing visual information of a wider size to a limited screen size may be included in the scope of the present disclosure.

According to the embodiment described with reference to FIG. 2 and related drawings so far, a list of unread messages that may exist in several chat rooms, to which the user belongs, can be intuitively viewed on one screen. In particular, it is possible to easily view unread messages through the collect view screen, without having to access each chat room, in which unread messages exist, and read unread messages one by one.

Figure 3:
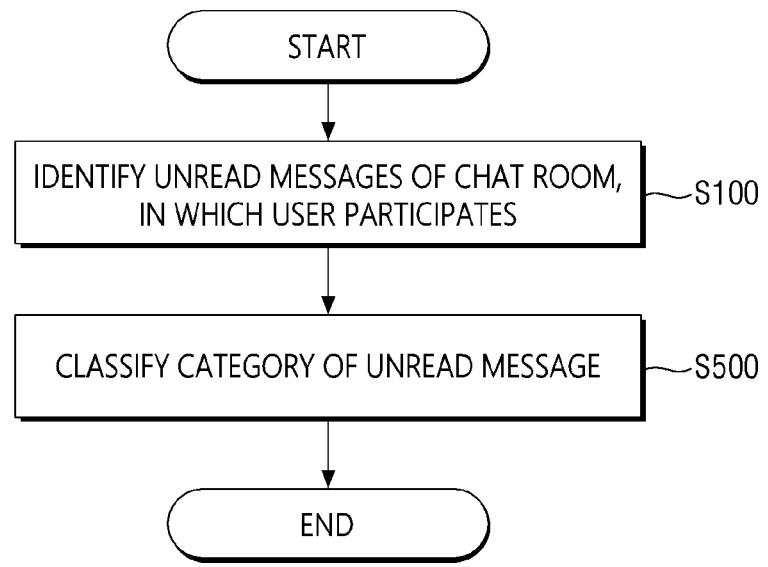

Hereinafter, various methods of the present disclosure will be described with reference to FIG. 3. FIG. 3 is an exemplary flowchart illustrating a method for classifying categories of unread messages.

Referring to FIG. 3, in step S100, an unread message of a chat room, in which the user participates, may be identified. In order to prevent duplicated description, a detailed description related to this step, reference can be made to step S100 illustrated in FIG. 2.

In step S500, categories of unread messages may be classified. The operation to be described in this step may be a pre-operation for classifying the category of the unread message and displaying the classified result to the user. For example, when the user returns from a long absence, a plurality of unread messages may be accumulated. In this case, more useful information may be provided to the user through classification of the unread message categories.

A detailed operation for classifying a category and a criterion thereof will be described in more detail below.

Regarding the classification of categories, in some embodiments, the categories of the unread messages may be classified based on the text analysis of the unread messages. Here, the text analysis may be understood as analyzing the content of the unread message. For such text analysis, various known algorithms such as a character string search algorithm and a character similarity determination algorithm may be used.

In an example related to text analysis, when 'request,' or 'confirm' is included in the unread message, the unread message may be classified into a 'request category,' and when 'question,' or '?' is included in the unread message, the unread message may be classified into a 'reply category,' and unread messages not classified in the above-described category may be classified as 'other category.' Also, in this example, even if 'request,' confirm,' 'question' or '?' is included, it can be classified as a 'request category' or a 'reply category' only when included with the user's name. And, even if 'request,' 'confirm,' or '?' is included, it may be classified into 'other category' when the user's name is not included.

In another example related to text analysis, if words such as 'immediate,' 'notice,' or 'issue' is included in the unread message, the unread message may be classified as an 'urgent category,' and if 'immediate,' notice,' or 'issue' is not included, the unread message may be classified as 'other category.' Also, as in the above example, only when the above-mentioned keyword is included with the user's name, it may be classified as an 'urgent category.'

The above-described examples related to text analysis may be implemented through keyword search and keyword similarity determination for unread messages using a string search algorithm. It should be noted that, unlike the previous example, the keyword may be modified and fixed in advance, or the keyword may be changed according to the user's setting.

In another example related to text analysis, when a hyperlink is included in an unread message, a category of the unread message may be classified according to a representative address of the hyperlink. For example, if a hyperlink such as 'a.co.kr/jira/123431' is included in the unread message, the unread message may be classified as 'a.co.kr,' which is a representative address of the hyperlink, and if a hyperlink such as 'b.com/13iat/1431' is included in the unread message, the unread message may be classified as 'b.com', which is a representative address of the hyperlink.

Regarding the classification of the category, in some embodiments, the category of the unread message may be classified based on the attachment type analysis of the unread message. Here, the attachment type analysis may be understood as analyzing the type of the file attached to the unread message. In order to identify the type of the file attached to the unread message, information on various attachment files, such as an extension or a file name, may be used.

In an example related to attachment type analysis, when the extension of a file attached to an unread message is 'pptx,' the unread message may be classified as a 'pptx category,' and when the extension of the file is 'hwp,' the unread message may be classified as 'hwp category.' In addition, by identifying various extensions, categories of unread messages may be classified according to attachment type analysis.

In another example related to the attachment type analysis, the category of the unread message may be classified based on the file name of the file attached to the unread message. For example, if 'a project' is included in the file name of a file attached to an unread message, the unread message may be classified as 'a project category,' and if 'b plan 2.0' is included in the file name of the file attached to the unread message, the unread message may be classified as a 'b plan 2.0 category.' It should be noted that the keywords included in these file names may be modified and fixed in advance, unlike the previous example, or the keywords may be changed according to the user's setting.

In relation to category classification, in some embodiments, in response to a user's gesture input, an operation of the user terminal 200 to classify the category may be initiated. Specifically, in response to the user's text analysis gesture, text analysis may be executed to classify unread message categories, and in response to the user's type analysis gesture, attachment type analysis may be executed to classify unread message categories.

Here, each gesture may include various user inputs capable of interacting with a user interface provided through the messenger application. For example, the input of the user selecting the 'text analysis button' or the 'attachment type analysis button' displayed on the screen of the messenger application may be a 'text analysis gesture' or a 'type analysis gesture'. However, the scope of the present disclosure is not limited to the above examples, and any input may be included in the scope of the present disclosure as long as it is a predetermined user input to initiate text analysis or attachment type analysis.

Figure 4:
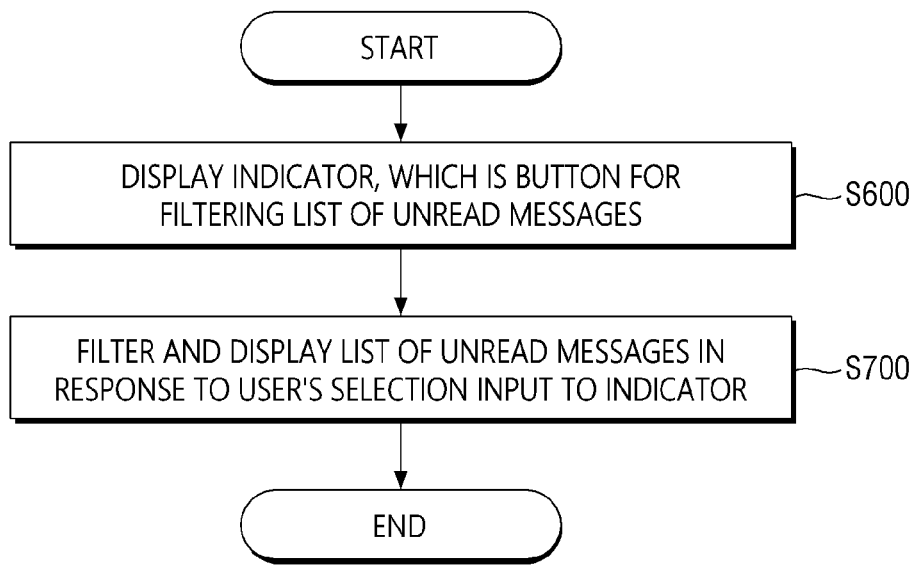

According to the embodiment described with reference to FIG. 3 so far, more useful information may be provided to the user through the classification of the unread message category. Hereinafter, various methods of the present disclosure will be described with reference to FIG. 4. FIG. 4 is an exemplary flowchart illustrating a method of displaying a list of filtered unread messages using categories of unread messages.

Referring to FIG. 4, in step S600, an indicator that is a button for filtering a list of unread messages may be displayed. Such an indicator may be displayed on the screen of the messenger application. In this case, for the convenience of the user, it may be preferable to display the list of unread messages on the collect view screen.

Figure 7:
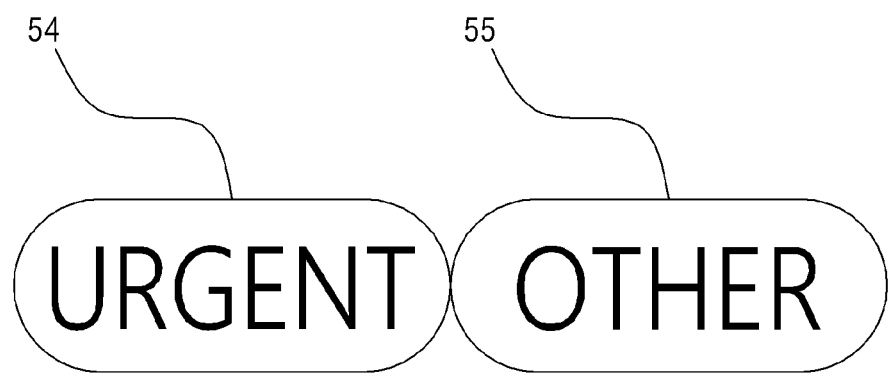
FIG. 7 is an exemplary diagram for describing an indicator that may be referred to in some embodiments of the present disclosure.

For a more detailed description related to the indicator, it will be described with reference to FIGS. 6 and 7. FIG. 6 shows the indicators 51a, 52a, and 53 displayed on the collect view screen. The categories of unread messages may be displayed on the indicators 51a, 52a, and 53 shown in FIG. 6. According to a filtering operation to be described later, when any one indicator is selected according to the user's selection input 60, only unread messages of a category corresponding to the selected indicator may be displayed on the collect view screen.

A category that can be displayed on the indicator may be different from that shown in FIG. 6. 'Request,' Respond,' and 'Chitchat' are displayed on each of the indicators 51a, 52a, and 53 shown in FIG. 6, but as shown in FIG. 7, 'urgent' and 'other' may be displayed on each of the indicators 54 and 55. In addition, it can be understood that the indicator may be displayed differently depending on the category.

Regarding the indicator, in some embodiments, the display order of the indicator is that it may be displayed first as the number of elements in the unread message set corresponding to the indicator increases. Here, the set of unread messages may mean a set having each unread message as an element. In addition, the display order of the indicators may be determined in various ways, for example, using various information such as a predetermined order of importance of the indicator, the time order of unread messages corresponding to the indicator, and the reverse time order of unread messages corresponding to the indicator, the display order of the indicators may be determined. According to the present embodiment, an indicator expected to be more important to the user may be displayed first than other indicators.

Referring back to FIG. 3, in step S700, in response to the user's selection input to the indicator, the list of unread messages may be filtered and displayed. Here, in order to filter the list of unread messages, the category of unread messages described with reference to FIG. 3 may be used.

Hereinafter, it will be described in more detail with reference to exemplary drawings related to filtering.

Figure 9:
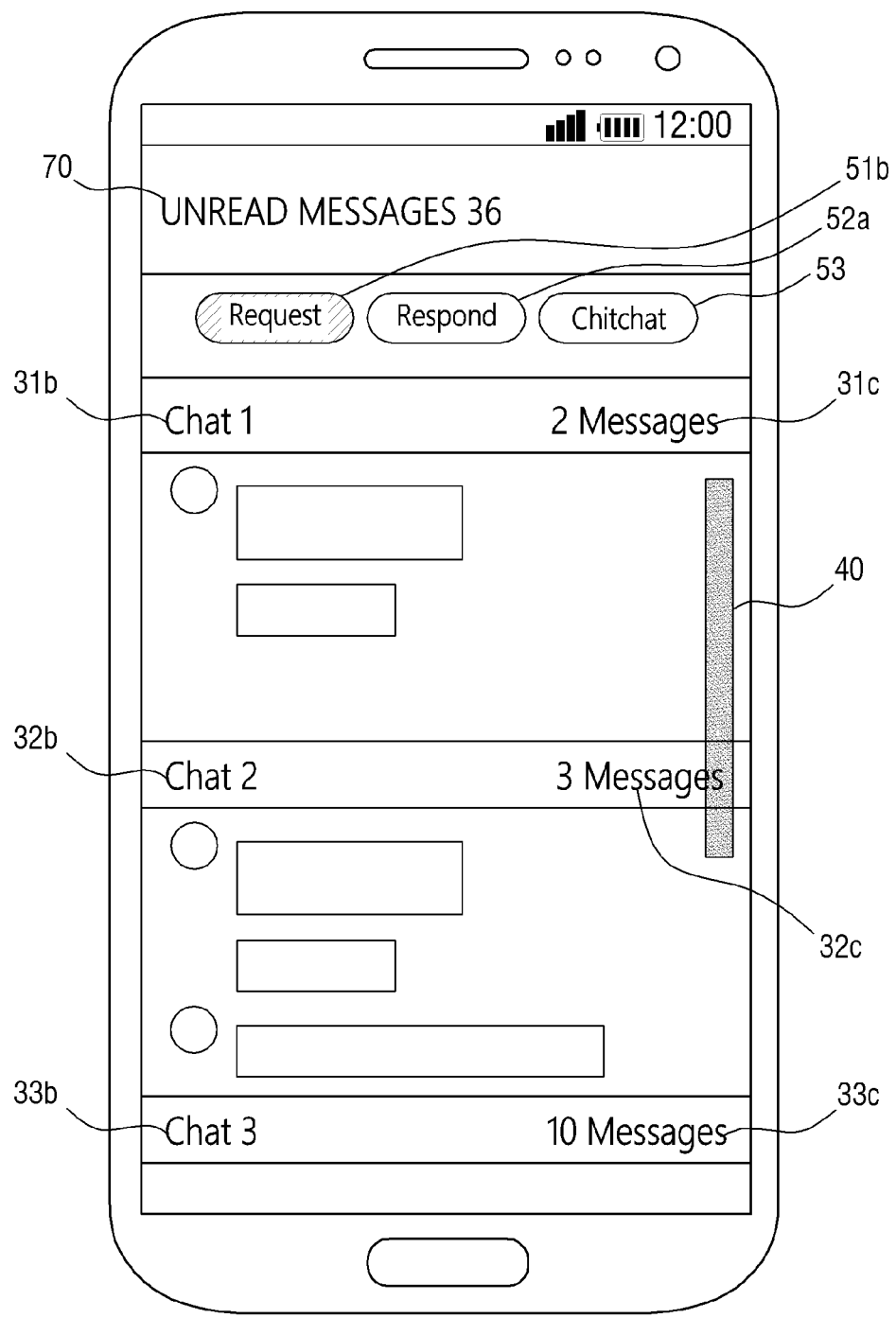

As described with reference to FIG. 6, when the Request indicator 51a is selected according to the user's selection input 60, the screen of the messenger application may be switched to FIG. 9. Here, as shown in FIG. 9, only unread messages corresponding to the Request indicator 51b may be displayed on the collect view screen. Comparing the total number identifier 70, chat room identifier 31b, 32b, 33b, and the number identifier 31c, 32c, 33c of unread message in FIGS. 6 and 9, it can be seen that unread messages unrelated to the Request indicator 51b have been removed from the collect view screen according to the user's selection input 60.

In addition, each of the indicators 51a, 52a, and 53 shown in FIG. 6 may change an indicator shape like the Request indicator 51b shown in FIG. 9 in response to a user input. In addition, the visual information of the indicator may be changed to point out the indicator selected by the user.

Figure 10:
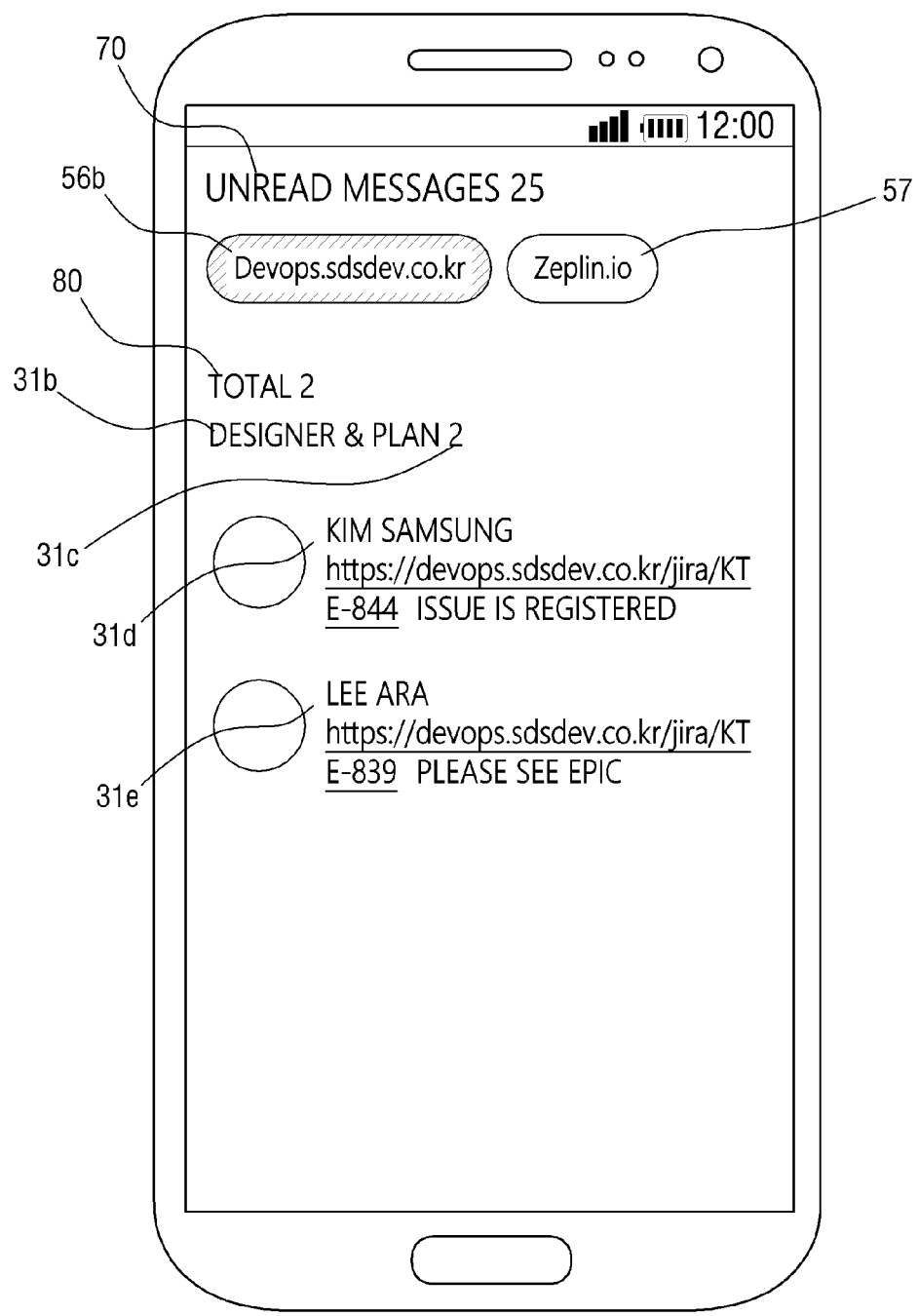
Figure 11:
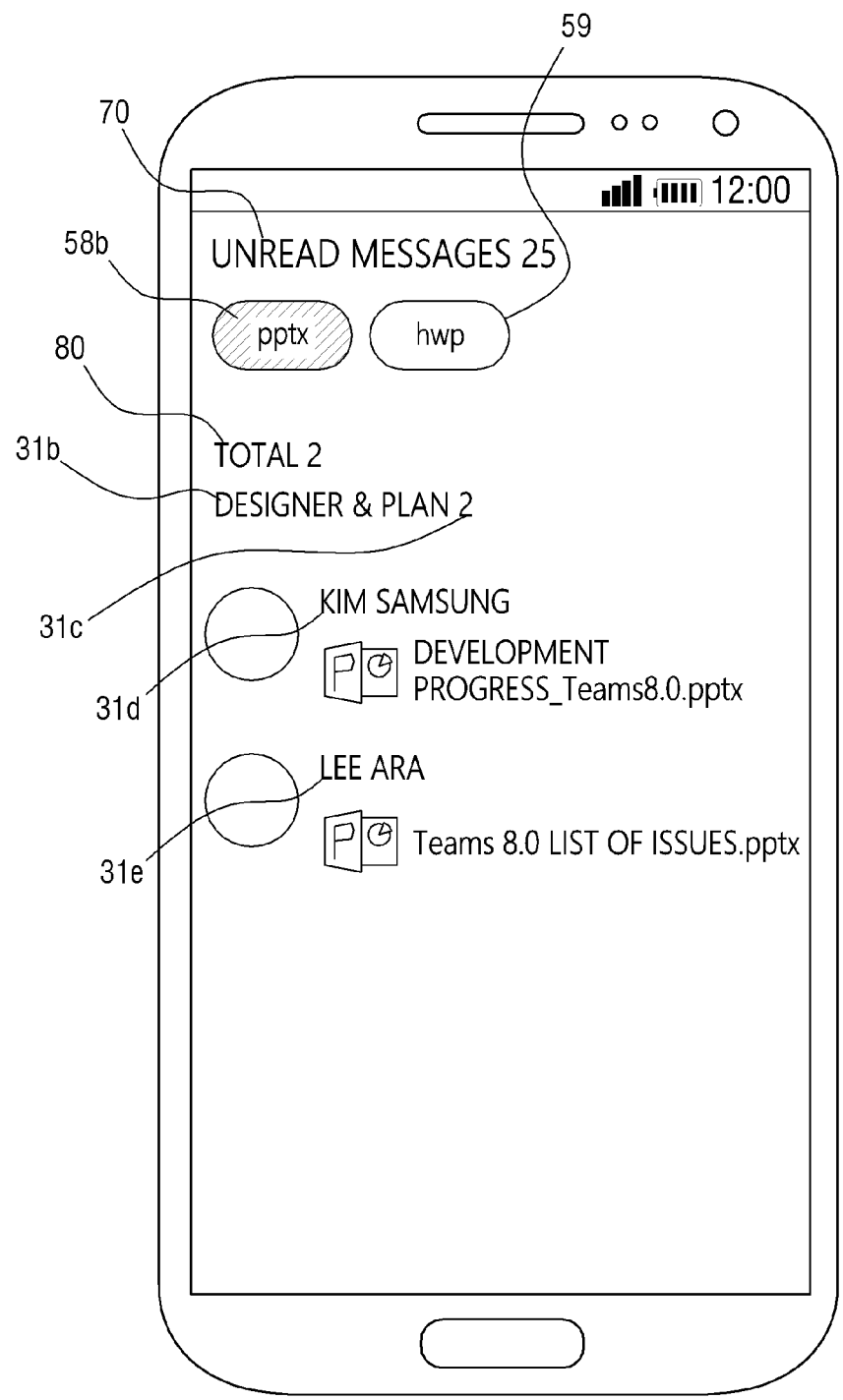

FIGS. 10 and 11 may be understood similarly to the previous description. FIG. 10 shows an example, in which categories are classified according to hyperlinks included in an unread message, and FIG. 11 shows an example, in which categories are classified according to a file type attached to an unread message. Referring to FIGS. 10 and 11, only unread messages corresponding to the indicators 56b and 58b selected according to the user's selection input 60 are displayed on the collect view screen, and the unread messages corresponding to the indicators 57 and 59 not selected according to the user's selection input 60 are removed from the collect view screen.

In addition, as shown in FIGS. 10 and 11, the user can view various information related to unread messages corresponding to the selected indicators 56b and 58b through the chat room identifier 31b, the number identifier of unread messages 31c, and the message transmission user identifiers 31d and 31e. Furthermore, the user may intuitively view the number of unread messages removed from the collect view screen by comparing the total number identifier 10 and the filtered number identifier 80.

So far, a method of displaying a filtered unread message using one indicator has been described. Hereinafter, a method of displaying a filtered unread message using two or more indicators will be described.

In relation to filtering using two or more indicators, in some embodiments, in response to a combination gesture of a user selecting each of the first indicator and the second indicator, a combination message selected from among a plurality of unread messages may be displayed on one screen.

Here, the combination gesture may include various user inputs capable of interacting with a user interface provided through a messenger application. For example, an input included in a user's drag, slide and swipe for each of the first indicator and the second indicator displayed on the screen of the messenger application with a time difference may be a combination gesture. As another example, the input of tapping, double tapping, pinching, and spreading for each of the first indicator and the second indicator displayed on the screen of the messenger application may be a combination gesture. However, the scope of the present disclosure is not limited to the above-described example, and any input may be included in the scope of the present disclosure as long as it is a predetermined user input for filtering using two or more indicators.

Figure 12:
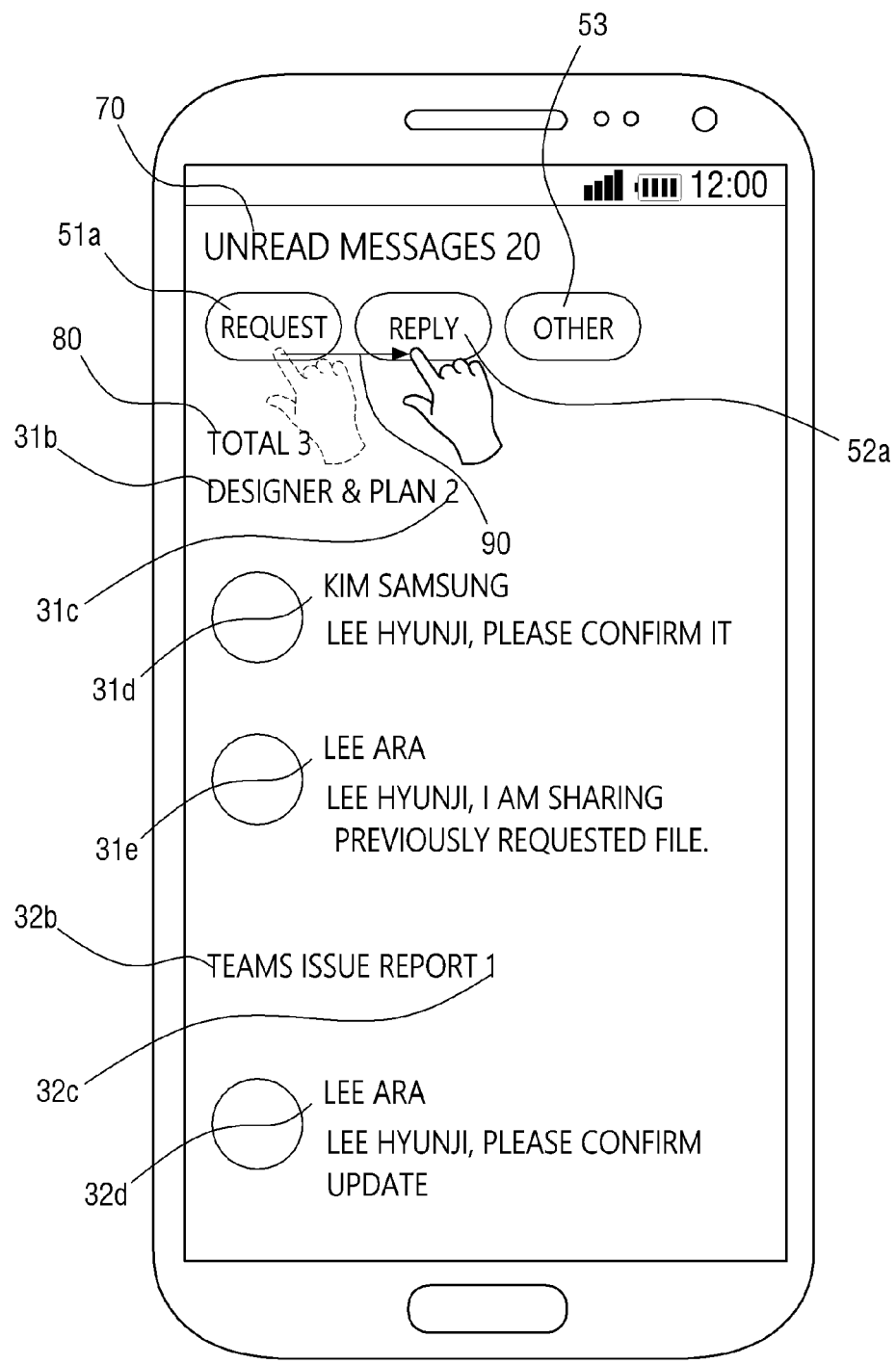
FIGS. 12 and 13 are exemplary views for describing filtering using a plurality of indicators that may be referred to in some embodiments of the present disclosure.
Figure 13:
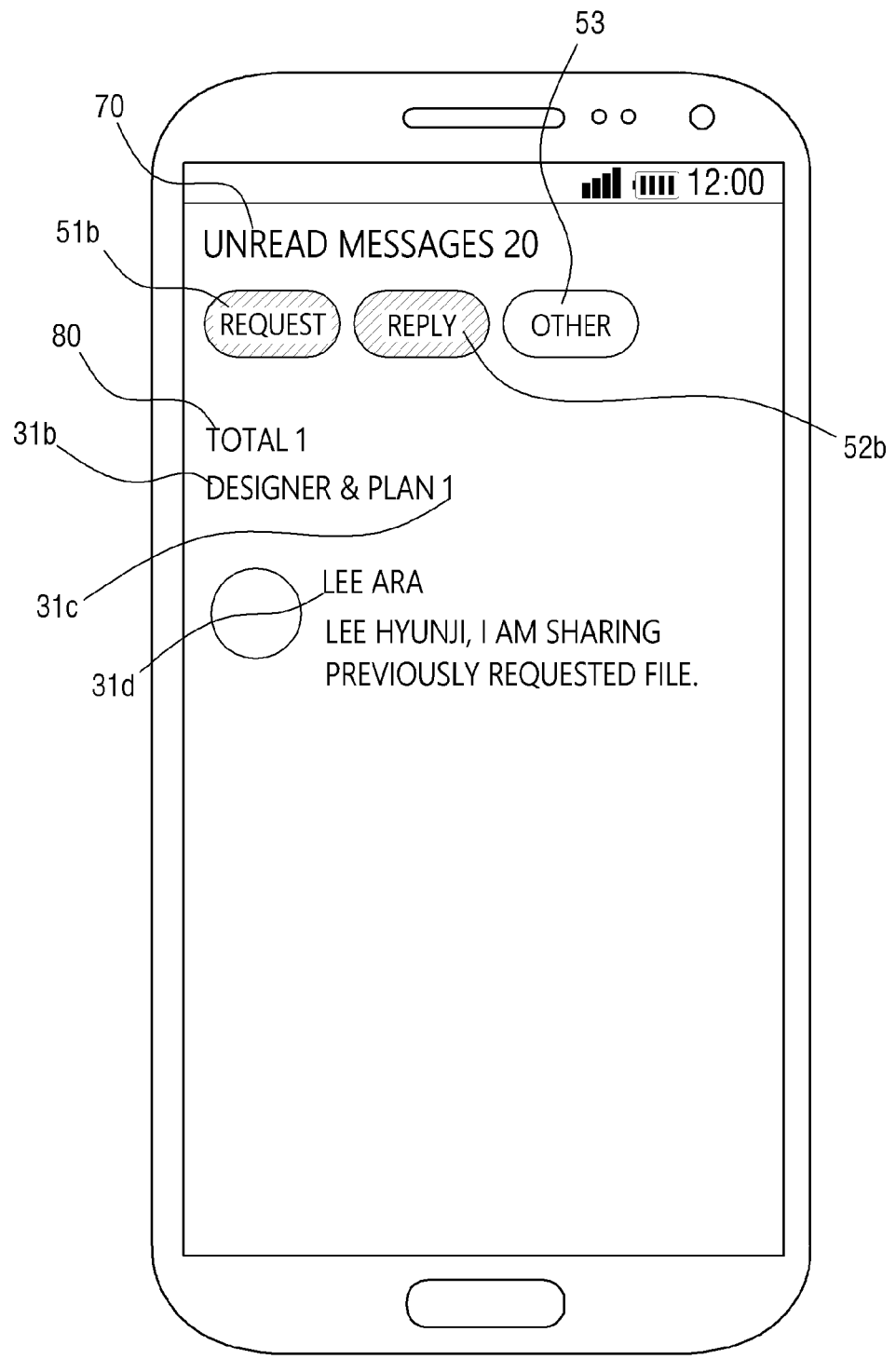

Also, the combination message may mean a set of unread messages according to a logical operation of the first unread message set corresponding to the first indicator and the second unread message set corresponding to the second indicator. For example, in response to the combination gesture, the combination message may be determined according to the '(and) operator' of the first unread message set and the second unread message set. FIG. 13 shows an example in which the combination gesture is based on a gesture such as tap, double tap, or other gesture for the indicators 51b and 52b, and the combination message is determined based on 'and operator'. For another example, in response to the combination gesture, the combination message may be determined according to the '(or) operator' of the first unread message set and the second unread message set. In contrast, it should be noted that the combination message may be determined according to any other logical operations. FIG. 12 shows an example in which the combination gesture is based on a gesture such as slide, swipe or other gesture for the indicators 51a and 52a and the combination message is determined based on 'or operator'.

In addition, the combination message may be determined to correspond to each of the plurality of combination gestures. For example, the first combination message corresponding to the first combination gesture may be a message set combined according to the '(and) operator' of the first unread message set and the second unread message set, and the second combination message corresponding to the second combination gesture may be a message set combined according to the '(or) operator' of the first unread message set and the second unread message set. In contrast, it should be noted that other combination gestures and combination messages may be determined.

According to the embodiment described with reference to FIG. 4 and related exemplary drawings so far, unread messages may be filtered and displayed. By selecting the category of the unread message through the selection of the indicator, the user can read the unread message of the category desired by the user.

Figure 14:
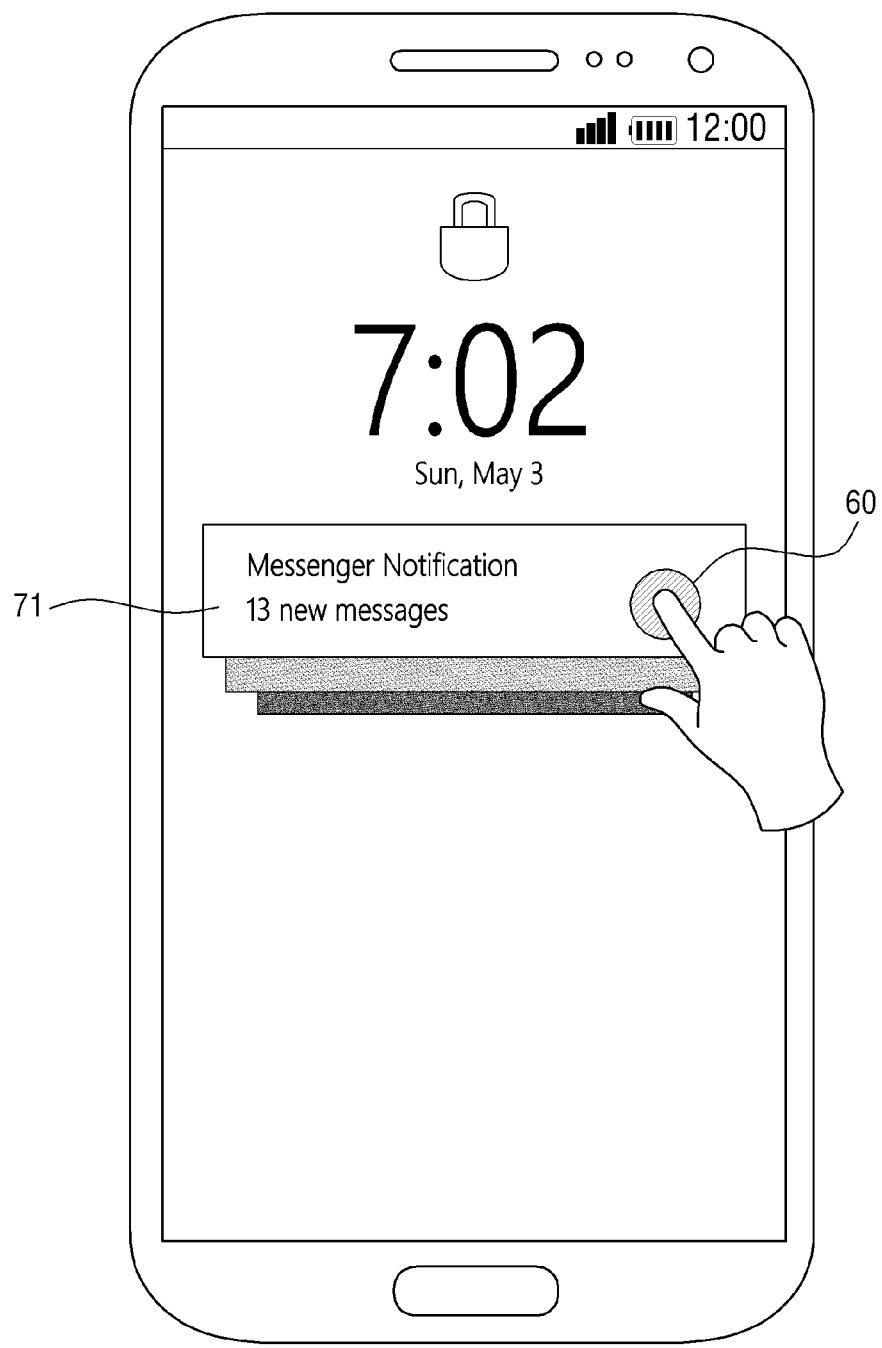
FIGS. 14 to 16 are exemplary views for describing a home screen of a user terminal that may be referred to in some embodiments of the present disclosure.
Figure 15:
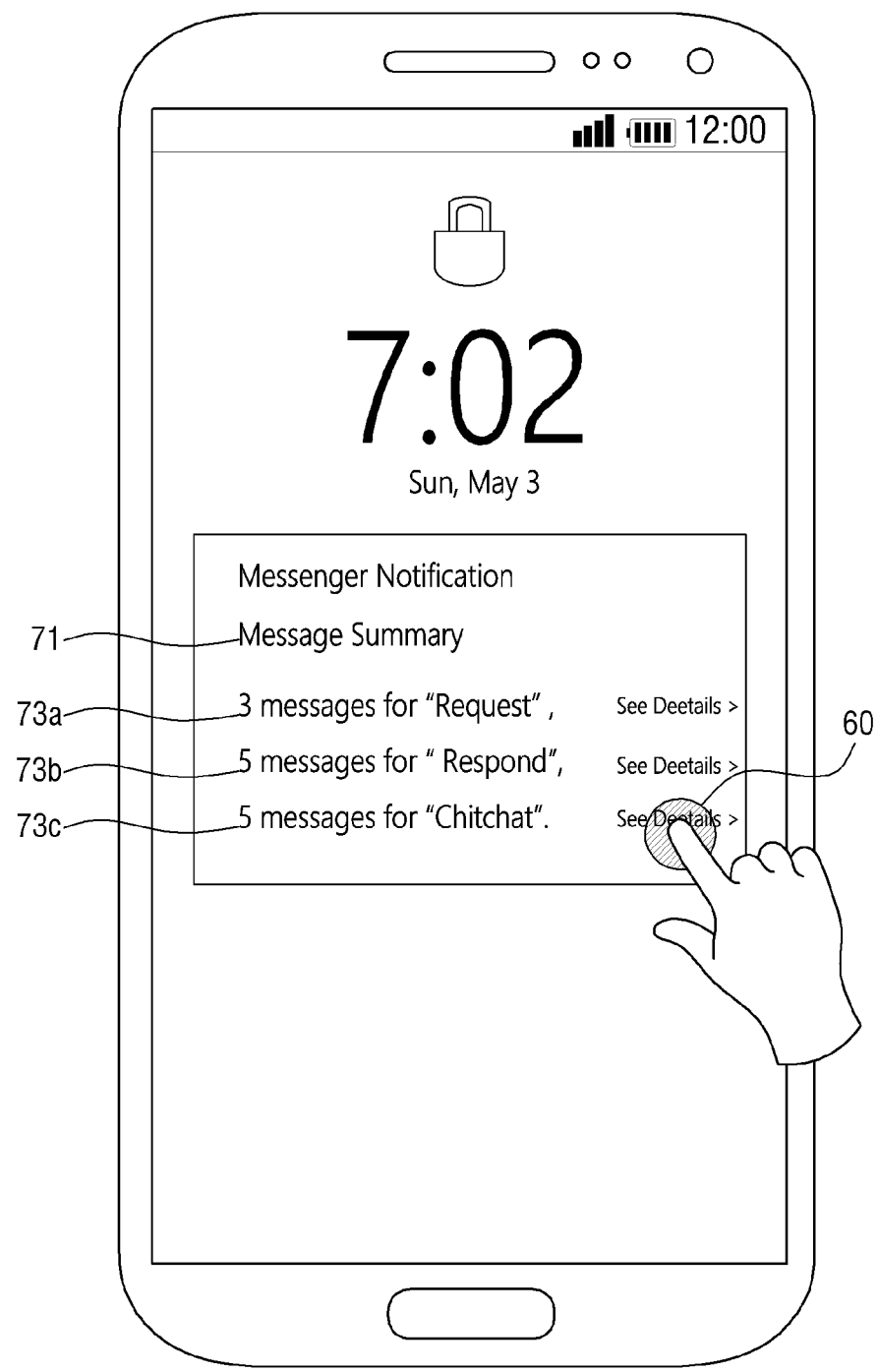
Figure 16:
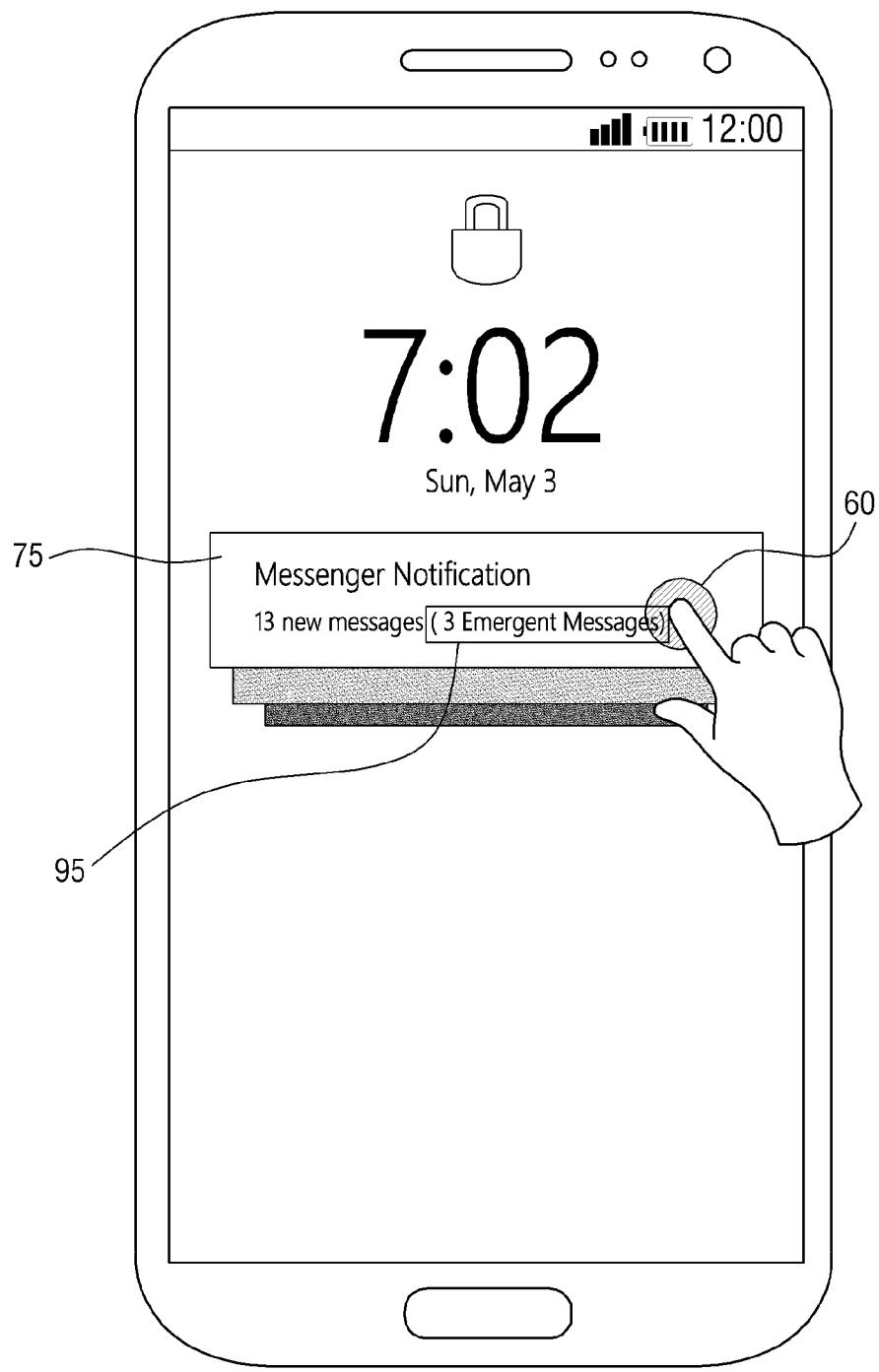

Hereinafter, a home screen of a user terminal that may be referred to in some embodiments of the present disclosure will be described with reference to FIGS. 14 to 16. FIGS. 14 to 16 show an example of a home screen of a user terminal, on which a messenger application is installed.

As shown in FIG. 14, an unread message notification 71 may be displayed on the home screen. In this case, in response to the user's selection input 60, the home screen may be switched to an example of the home screen shown in FIG. 15.

As shown in FIG. 15, a detailed summary of the unread message notification 71 may be displayed on the home screen. Here, the number of unread messages corresponding to the unread message categories 73a, 73b, and 73c may be displayed. In this case, in response to the user's selection input 60, it may be switched to a collect view screen, in which only the unread message corresponding to any one of the plurality of categories 73a, 73b, and 73c are displayed. The collect view screen, in which unread messages are filtered, may be understood with reference to FIGS. 9 to 11.

When the urgent category 95 is set, as shown in FIG. 16, the urgent category 95 may be highlighted in the unread message notification 71. Various well-known methods may be applied to highlighting of the present disclosure, for example, the urgent category 95 may be displayed in red. In addition, as in FIG. 15, in response to the user's selection input 60, it may be switched to a collect view screen, in which only the unread message corresponding to the urgent category 95 are displayed.

According to various methods of the present disclosure described with reference to FIGS. 2 to 4 and related exemplary drawings so far, a list of unread messages can be viewed on one screen. The user can intuitively view the unread messages without accessing the chat room through the collect view screen, in which the list of unread messages is displayed.

Figure 17:
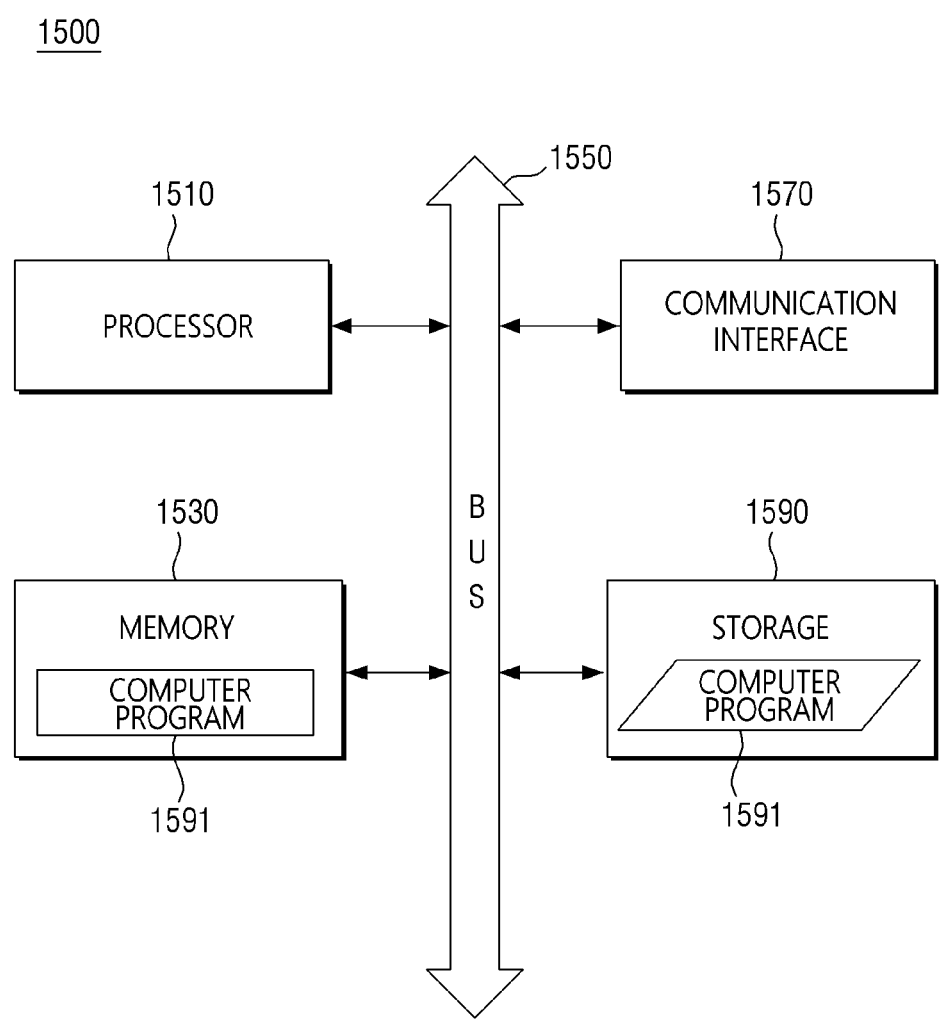
FIG. 17 illustrates an example computing device that may implement devices and/or systems in accordance with various embodiments of the present disclosure.

Hereinafter, an exemplary computing device 1500 capable of implementing an unread message display device according to some embodiments of the present disclosure will be described in more detail with reference to FIG. 17.

The computing device 1500 may include one or more processors 1510, a bus 1550, a communication interface 1570, a memory 1530 for loading a computer program 1591 executed by the processor 1510, and a storage 1590 for storing the program 1591. However, only the components related to the embodiment of the present disclosure are illustrated in FIG. 17. Accordingly, one of ordinary skill in the art, to which the present disclosure pertains, can know that other general-purpose components other than those shown in FIG. 17 may be further included.

The processor 1510 controls the overall operation of each component of the computing device 1500. The processor 1510 may include a central processing unit (CPU), a micro processor unit (MPU), a micro controller unit (MCU), a graphic processing unit (GPU), or any type of processor well known in the art of the present disclosure. In addition, the processor 1510 may perform an operation on at least one application or program for executing the method according to the embodiments of the present disclosure. The computing device 1500 may include one or more processors.

The memory 1530 stores various data, commands, and/or information. The memory 1530 may load one or more programs 1591 from the storage 1590 to execute a method according to embodiments of the present disclosure. The memory 1530 may be implemented as a volatile memory such as RAM, but the technical scope of the present disclosure is not limited thereto.

The bus 1550 provides communication functions between components of the computing device 1500. The bus 1550 may be implemented as various types of buses, such as an address bus, a data bus, and a control bus.

The communication interface 1570 supports wired/wireless Internet communication of the computing device 1500. Also, the communication interface 1570 may support various communication methods other than Internet communication. To this end, the communication interface 1570 may be configured to include a communication module well known in the technical field of the present disclosure.

According to some embodiments, the communication interface 1570 may be omitted.

The storage 1590 may non-temporarily store the one or more programs 1591 and various data.

The storage 1590 may include a non-volatile memory such as a read only memory (ROM), an erasable programmable ROM (EPROM), an electrically erasable programmable ROM (EEPROM), a flash memory, a hard disk, a removable disk, or any well-known computer-readable recording medium in the art to which the present disclosure pertains.

The computer program 1591 may include one or more instructions that, when loaded into the memory 1530, cause the processor 1510 to perform methods/operations according to various embodiments of the present disclosure. That is, the processor 1510 may perform the methods/operations according to various embodiments of the present disclosure by executing the one or more instructions.

So far, various embodiments of the present disclosure and effects according to the embodiments have been described with reference to FIGS. 1 to 17. Effects according to the technical spirit of the present disclosure are not limited to the above-mentioned effects, and other effects not mentioned will be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method performed by a computing device for displaying an unread message, the method comprising:
    identifying a first unread message of a first chat room in which a user using the computing device participates, and a second unread message of a second chat room in which the user participates, wherein the first chat room and the second chat room are different, and the first unread message and the second unread message are different; and
    simultaneously displaying the first unread message and the second unread message on one screen based on the user's selection input to a collect view button,
    wherein the collect view button is a button for moving to a collect view screen, and the collect view button displays only when a number of a plurality of unread messages including the first unread message and the second unread message is equal to or greater than a reference number.

2. The method of claim 1 further comprising:
    classifying a category of the first unread message and a category of the second unread message based on text analysis of the first unread message and the second unread message, respectively.

3. The method of claim 2, wherein the text analysis is executed based on a user's text analysis gesture.

4. The method of claim 2, wherein simultaneously displaying the first unread message and the second unread message on one screen comprises:
    when the first unread message is classified into a first category and the second unread message is classified into a second category that is different from the first category, as a result of the classifying,
    displaying a screen, in which the second unread message is filtered, based on the user's selection input to a first indicator corresponding to the first category; and
    displaying a screen, in which the first unread message is filtered, based on the user's selection input to a second indicator corresponding to the second category.

5. The method of claim 1 further comprising:
    classifying a category of the first unread message and a category of the second unread message based on attachment-type analysis of the first unread message and the second unread message, respectively.

6. The method of claim 5, wherein the attachment-type analysis is executed based on a user's type analysis gesture.

7. The method of claim 5, wherein simultaneously displaying the first unread message and the second unread message on one screen comprises:
    when the first unread message is classified into a first category and the second unread message is classified into a second category that is different from the first category as a result of the classifying,
    displaying a screen, in which the second unread message is filtered, based on the user's selection input to a first indicator corresponding to the first category; and
    displaying a screen, in which the first unread message is filtered, based on the user's selection input to a second indicator corresponding to the second category.

8. The method of claim 1 further comprising:
    displaying a plurality of indicators, wherein each of the plurality of indicators is a button for filtering a plurality of unread messages including the first unread message and the second unread message.

9. The method of claim 8, wherein simultaneously displaying the first unread message and the second unread message on one screen comprises:
    displaying a combination message selected from among the plurality of unread messages on one screen based on the user's combination gesture of selecting each of a first indicator included in the plurality of indicators and a second indicator that is different from the first indicator, wherein the combination message is an unread message set obtained by combining a first unread message set corresponding to the first indicator and a second unread message set corresponding to the second indicator based on the combination gesture.

10. The method of claim 8, wherein displaying the plurality of indicators comprises:
    preferentially displaying a first indicator over a second indicator in a display order, when a number of elements in a first unread message set corresponding to the first indicator exceeds a number of elements in a second unread message set corresponding to the second indicator,
    wherein the first indicator and the second indicator are included in the plurality of indicators, and the first indicator and the second indicator are different.

11. The method of claim 1, wherein simultaneously displaying the first unread message and the second unread message on one screen comprises:
    preferentially displaying the first unread message set over the second unread message set in a display order, when a number of elements in a first unread message set corresponding to the first chat room including the first unread message exceeds a number of elements in a second unread message set corresponding to the second chat room.

12. An apparatus for displaying an unread message comprising:
    a processor;
    a network interface;
    a memory; and
    a computer program loaded into the memory and executed by the processor;
    wherein the computer program includes instructions for performing operations comprising:
    identifying a first unread message of a first chat room in which a user participates, and a second unread message of a second chat room in which the user participates, wherein the first chat room and the second chat room are different, and the first unread message and the second unread message are different; and
    simultaneously displaying the first unread message and the second unread message on one screen based on the user's selection input to a collect view button,
    wherein the collect view button is a button for moving to a collect view screen, and the collect view button displays only when a number of a plurality of unread messages including the first unread message and the second unread message is equal to or greater than a reference number.

13. The apparatus of claim 12, wherein the operations further comprise,
classifying a category of the first unread message and a category of the second unread message based on text analysis of the first unread message and the second unread message, respectively.

14. The apparatus of claim 12, wherein the operations further comprise,
classifying a category of the first unread message and a category of the second unread message based on attachment-type analysis of the first unread message and the second unread message, respectively.

15. The apparatus of claim 12, wherein the operations further comprise,
displaying a plurality of indicators,
wherein each of the plurality of indicators is a button for filtering a plurality of unread messages including the first unread message and the second unread message.

16. The apparatus of claim 12, wherein the simultaneously displaying the first unread message and the second unread message on one screen comprises:
preferentially displaying a first unread message set over a second unread message set in a display order, when a number of elements in the first unread message set corresponding to the first chat room including the first unread message exceeds a number of elements in the second unread message set corresponding to the second chat room including the second unread message.

17. A non-transitory computer-readable recording medium comprising instructions executable by a processor of a computing device,
wherein the instructions, when executed by the processor of the computing device, cause the computing device to perform operations comprising:
identifying a first unread message of a first chat room in which a user using the computing device participates, and a second unread message of a second chat room in which the user participates, wherein the first chat room and the second chat room are different, and the first unread message and the second unread message are different; and
simultaneously displaying the first unread message and the second unread message on one screen based on the user's selection input to a collect view button,
wherein the collect view button is a button for moving to a collect view screen, and the collect view button displays only when a number of a plurality of unread messages including the first unread message and the second unread message is equal to or greater than a reference number.

* * * * *